United States Patent
Kim et al.

(10) Patent No.: US 9,447,275 B2
(45) Date of Patent: Sep. 20, 2016

(54) MOLDED ARTICLE FOR AUTOMOBILE USING THERMOPLASTIC RESIN COMPOSITION

(71) Applicant: Samsung SDI Co., Ltd., Yongin-si (KR)

(72) Inventors: In-Chol Kim, Uiwang-si (KR);
Kee-Hae Kwon, Uiwang-si (KR);
Jung-Woo Park, Uiwang-si (KR);
Chang-Min Hong, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/474,584

(22) Filed: Sep. 2, 2014

(65) Prior Publication Data
US 2015/0065652 A1 Mar. 5, 2015

(30) Foreign Application Priority Data
Sep. 3, 2013 (KR) .......................... 10-2013-0105515

(51) Int. Cl.
*C08L 69/00* (2006.01)

(52) U.S. Cl.
CPC .......... *C08L 69/00* (2013.01); *C08L 2205/025* (2013.01); *C08L 2205/035* (2013.01); *C08L 2207/53* (2013.01)

(58) Field of Classification Search
CPC .............. C08L 69/00; C08L 2205/025; C08L 2205/035; C08L 2207/53; C08L 51/04; C08L 33/14; C08F 265/04
See application file for complete search history.

(56) References Cited

U.S. PATENT DOCUMENTS

| | | | |
|---|---|---|---|
| 4,409,363 A * | 10/1983 | Brandstetter | C08J 3/005 525/146 |
| 4,880,875 A | 11/1989 | Wassmuth et al. | |
| 4,885,335 A | 12/1989 | Gallucci et al. | |
| 5,196,480 A | 3/1993 | Seitz et al. | |
| 6,111,012 A | 8/2000 | Fischer et al. | |
| 6,512,077 B1 * | 1/2003 | Miyamoto et al. | 528/196 |
| 7,514,502 B2 | 4/2009 | Kim et al. | |
| 8,367,770 B2 | 2/2013 | Ha et al. | |
| 2005/0171297 A1 | 8/2005 | Koevoets et al. | |
| 2013/0345362 A1 | 12/2013 | Maeda et al. | |

FOREIGN PATENT DOCUMENTS

| | | |
|---|---|---|
| CN | 1346386 A | 4/2002 |
| CN | 101360770 A | 2/2009 |
| EP | 0450485 A2 | 10/1991 |
| EP | 2404941 A1 | 1/2012 |
| EP | 2692754 A1 | 2/2014 |
| KR | 10-2004-0105464 A | 12/2004 |
| KR | 10-2005-0020200 A | 3/2005 |
| KR | 10-2007-0009559 A | 1/2007 |
| KR | 10-2007-0073230 A | 7/2007 |
| KR | 10-0774821 B1 | 11/2007 |
| KR | 10-2007-0117315 A | 12/2007 |
| KR | 10-0815995 | 12/2007 |
| KR | 10-2008-0112842 A | 12/2008 |
| KR | 10-2009-0038507 A | 4/2009 |
| KR | 10-2009-0072651 A | 7/2009 |
| KR | 10-2010-0045830 A | 5/2010 |
| KR | 0-2010-0132235 A | 12/2010 |
| KR | 10-2011-0063091 A | 6/2011 |
| KR | 10-2012-0004261 A | 1/2012 |
| KR | 0-2012-0050138 A | 5/2012 |
| KR | 10-2012-0072972 A | 7/2012 |
| KR | 10-2013-0078199 A | 7/2013 |
| WO | 2012/133190 A1 | 10/2012 |

OTHER PUBLICATIONS

Search Report in counterpart Chinese Application No. 201410444312.1 dated Sep. 24, 2015, pp. 1-3.
Search Report in commonly owned European Application No. 14174715.4 dated Nov. 5, 2014, pp. 1-5.
Office Action in commonly owned U.S. Appl. No. 14/248,478 mailed Feb. 1, 2016, pp. 1-12.

* cited by examiner

*Primary Examiner* — James J Seidleck
*Assistant Examiner* — Jeffrey Lenihan
(74) *Attorney, Agent, or Firm* — Additon, Higgins, & Pendleton, P.A.

(57) ABSTRACT

A molded article for an automobile is formed using a thermoplastic resin composition including (A) about 1 to about 20 wt % of a first rubber-modified acrylic-based graft copolymer having an average particle diameter of greater than or equal to about 100 nm and less than about 200 nm, (B) about 1 to about 20 wt % of a second rubber-modified acrylic-based graft copolymer having an average particle diameter of greater than or equal to about 200 nm and less than or equal to about 400 nm, (C) about 5 to about 40 wt % of a first vinyl-based copolymer of an alkyl(meth)acrylate monomer, an aromatic vinyl monomer, and an unsaturated nitrile monomer wherein the alkyl(meth)acrylate monomer is included in an amount of greater than or equal to about 50 wt %, and (D) about 50 to about 85 wt % of a polycarbonate resin, wherein the molded article is a radiator grill or an outside mirror housing.

16 Claims, No Drawings

MOLDED ARTICLE FOR AUTOMOBILE USING THERMOPLASTIC RESIN COMPOSITION

CROSS-REFERENCE TO RELATED APPLICATION

This application claims priority to and the benefit of Korean Patent Application No. 10-2013-0105515 filed in the Korean Intellectual Property Office on Sep. 3, 2013, the entire disclosure of which is incorporated herein by reference.

FIELD OF THE INVENTION

The present invention relates to a molded article for an automobile manufactured using a thermoplastic resin composition.

BACKGROUND

Thermoplastic resins can have improved properties such as lower specific gravity as compared to glass or metal and also can have improved formability, impact resistance, and the like. Recently, thermoplastic resins have been used to manufacture plastic products, such as electric/electronic products, to meet demands for less expensive and larger and lighter products. The plastic products have rapidly replaced conventional glass or metal products and been widely used from electric/electronic products to automobile parts.

For example, an ASA resin consisting of an acrylate-styrene-acrylonitrile copolymer has excellent stability upon exposure to ultraviolet (UV) rays and thus, has been widely used for products that are directly exposed to UV rays, such as exterior components of a car, building materials, and the like. However, the ASA resin necessarily requires excessive addition of an acrylate-based rubber due to low impact-resistance characteristics of the rubber and thus, has a problem of heat resistance deterioration, which limits its use. For example, a radiator grill, an outside mirror housing, or the like as an exterior component for a car manufactured using the ASA resin may be distorted due to an excessive amount of rubber added to the ASA resin after injection-molding the products and frequently damaged by a chip flying during driving.

In order to solve this problem, the ASA resin may be alloyed with a polycarbonate (PC) resin having high impact strength and heat resistance. The alloy, however, may not realize excellent coloring properties due to the difference between the high refractive index of the PC resin and the low refractive index of the ASA resin. Various patents about the ASA resin, for example, Korean Patent Laid-Open No. 2009-0038507 and the like have been issued, but there is no patent about improvement of coloring properties of the alloy composition of the PC resin and the ASA resin. Accordingly, there is a need for a thermoplastic resin composition having excellent impact strength, heat resistance, weather resistance and coloring properties and a molded article using the same.

SUMMARY

The present invention provides a molded article for an automobile using a thermoplastic resin composition that can have excellent impact strength, heat resistance, weather resistance and coloring properties, for example, a molded article for an automobile such as a radiator grill and/or an outside mirror housing.

In one embodiment of the present invention, provided is a molded article for an automobile manufactured using a thermoplastic resin composition including (A) about 1 to about 20 wt % of a first rubber-modified acrylic-based graft copolymer having an average particle diameter of greater than or equal to about 100 nm and less than about 200 nm, (B) about 1 to about 20 wt % of a second rubber-modified acrylic-based graft copolymer having an average particle diameter of greater than or equal to about 200 nm and less than or equal to about 400 nm, (C) about 5 to about 40 wt % of a first vinyl-based copolymer of an alkyl(meth)acrylate monomer, an aromatic vinyl monomer, and an unsaturated nitrile monomer wherein the alkyl(meth)acrylate monomer is included in an amount of greater than or equal to about 50 wt %, and (D) about 50 to about 85 wt % of a polycarbonate resin. The molded article for an automobile may be a radiator grill and/or an outside mirror housing.

The first rubber-modified acrylic-based graft copolymer (A) may include (a1)) about 40 to about 70 wt % of an acrylic-based rubbery polymer core and (a2) about 30 to about 60 wt % of a shell layer formed of a copolymer of an aromatic vinyl monomer and an unsaturated nitrile monomer grafted on the acrylic-based rubbery polymer core.

The first rubber-modified acrylic-based graft copolymer (A) may include (a1)) an acrylic-based rubbery polymer core including (a1-1) an internal core layer consisting of a copolymer of an alkyl(meth)acrylate monomer and an aromatic vinyl monomer and (a1-2) an external core layer consisting of an alkyl(meth)acrylate-based polymer; and (a2) a shell layer formed by grafting a copolymer of an aromatic vinyl monomer and an unsaturated nitrile monomer on the acrylic-based rubbery polymer core.

The grafting ratio of the shell layer (a2) of the first rubber-modified acrylic-based graft copolymer (A) may range from about 40 to about 80%.

The second rubber-modified acrylic-based graft copolymer (B) may include (b1) an acrylic-based rubbery polymer core having a weight average molecular weight of about 200,000 to about 10,000,000 g/mol; and (b2) a shell layer formed by grafting a copolymer of an aromatic vinyl monomer and a unsaturated nitrile monomer on the acrylic-based rubbery polymer core and having a weight average molecular weight of about 50,000 to about 500,000 g/mol.

The second rubber-modified acrylic-based graft copolymer (B) may include (b1) about 30 to about 80 wt % of an acrylic-based rubbery polymer core and (b2) about 20 to about 70 wt % of a shell layer formed by grafting a copolymer of an aromatic vinyl monomer and unsaturated nitrile monomer on the acrylic-based rubbery polymer core.

The second rubber-modified acrylic-based graft copolymer (B) may include (b1) an acrylic-based rubbery polymer core including (b1-1) a first core layer consisting of an alkyl(meth)acrylate-based polymer, (b1-2) a second core layer consisting of a copolymer of an alkyl(meth)acrylate monomer and an aromatic vinyl monomer and formed outside of the first core layer, and (b1-3) a third core layer consisting of a copolymer of an alkyl(meth)acrylate monomer and an aromatic vinyl monomer and formed outside of the second core layer, and (b2) a shell layer formed of the aromatic vinyl monomer and an unsaturated nitrile monomer grafted into the third core layer.

In the first vinyl-based copolymer (C), the alkyl(meth)acrylate monomer may be included in an amount of about 50 to about 95 wt % based on the total weight of the first vinyl-based copolymer (C).

In the first vinyl-based copolymer (C), the alkyl(meth)acrylate monomer may include methyl(meth)acrylate, ethyl (meth)acrylate, propyl(meth)acrylate, isopropyl(meth)acrylate, butyl(meth)acrylate, t-butyl(meth)acrylate, octyl(meth)acrylate, 2-ethylhexyl(meth)acrylate, or a combination thereof, the aromatic vinyl monomer may include styrene, o-ethyl styrene, m-ethyl styrene, p-ethyl styrene, α-methyl styrene, o-t-butyl styrene, bromo styrene, chloro styrene, trichloro styrene, or a combination thereof, and the unsaturated nitrile monomer may include acrylonitrile, methacrylonitrile, fumaronitrile, or a combination thereof.

The first vinyl-based copolymer (C) may have a weight average molecular weight ranging from about 90,000 to about 200,000 g/mol.

An average refractive index of the first rubber-modified acrylic-based graft copolymer (A) and the second rubber-modified acrylic-based graft copolymer (B) and a refractive index of the first vinyl-based copolymer (C) may have a difference ranging from about 0.001 to about 0.02.

The thermoplastic resin composition may further include a second vinyl-based copolymer (E) obtained by copolymerizing an aromatic vinyl monomer and an unsaturated nitrile monomer.

The second vinyl-based copolymer (E) may include the aromatic vinyl monomer in an amount of about 60 to about 80 wt % and the unsaturated nitrile monomer in an amount of about 20 to about 40 wt %.

The second vinyl-based copolymer (E) may have a weight average molecular weight ranging from about 80,000 to about 200,000 g/mol.

The molded article for an automobile may have Izod impact strength ranging from about 50 to about 90 kgf·cm/cm.

The molded article for an automobile may be black and have an L value of the thermoplastic resin composition ranging about 27 to about 30 in a color coordinate of International Commission on Illumination (CIE).

The molded article for an automobile may have a Vicat softening temperature ranging from about 100 to about 140° C.

The molded article for an automobile may have ΔE ranging from about 0.1 to about 4.0 after a 2,500 kJ exposure evaluation under a SAE J1960 condition.

The molded article for an automobile according to one embodiment may have excellent impact strength, weather resistance, heat resistance and/or coloring properties.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, the term "substituted" refers to one substituted with a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group, a C1 to C10 trifluoroalkyl group such as a trifluoromethyl group and the like; and/or a cyano group, instead of at least one hydrogen of a compound.

As used herein, when a definition is not otherwise provided, the term "hetero" refers to one including 1 to 3 heteroatoms including N, O, S, and/or P, in place of one or more carbon atoms in a compound or a substituent.

As used herein, when a definition is not otherwise provided, the term "alkyl group" refers to a "saturated alkyl group" without an alkene group or an alkyne group; or an "unsaturated alkyl group" including at least one of an alkene group and an alkyne group. The term "alkene group" refers to a substituent in which at least two carbon atoms are bound with at least one carbon-carbon double bond, and the term "alkyne group" refers to a substituent in which at least two carbon atoms are bound with at least one carbon-carbon triple bond. The alkyl group may be a branched, linear, or cyclic alkyl group.

The alkyl group may be a C1 to C20 alkyl group, for example a C1 to C6 lower alkyl group, a C7 to C10 middle alkyl group, or a C11 to C20 higher alkyl group.

The term "aromatic group" refers to a compound including a cyclic structure where all elements have p-orbitals which form conjugation. An aryl group and a heteroaryl group may be exemplified.

The term "aryl group" refers to a monocyclic or fused ring-containing polycyclic (i.e., rings sharing adjacent pairs of carbon atoms) groups.

The term "heteroaryl group" refers to one including 1 to 3 heteroatoms including N, O, S, and/or P in an aryl group, in place of one or more carbon atoms. When the heteroaryl group is a fused ring, each ring may include 1 to 3 heteroatoms.

As used herein, when a specific definition is not otherwise provided, (meth)acrylate refers to acrylate or methacrylate and alkyl (meth)acrylate refers to alkyl acrylate or alkyl methacrylate. The (meth)acrylic acid alkyl ester refers to acrylic acid alkyl ester or methacrylic acid alkyl ester, and (meth)acrylic acid ester refers to acrylic acid ester or methacrylic acid ester.

As used herein, when a definition is not otherwise provided, the "copolymerization" refers to a block copolymerization, random copolymerization, graft copolymerization, or alternating copolymerization, and the term "copolymer" refers to a block copolymer, random copolymer, graft copolymer, or alternating copolymer.

As used herein, the term "average particle diameter" refers to a volume average particle size measured using a Mastersizer S Ver.2.14 manufactured by Malvern Co., Ltd.

As used herein, the "weight average molecular weight" refers to the weight average molecular weight measured by gel permeation chromatography (GPC) using tetrahydrofuran (THF) as solvent and converted to that of polystyrene (PS).

In one embodiment of the present invention, provided is a molded article for an automobile manufactured using a thermoplastic resin composition including (A) about 1 to about 20 wt % of a first rubber-modified acrylic-based graft copolymer having an average particle diameter of greater than or equal to about 100 nm and less than about 200 nm, (B) about 1 to about 20 wt % of a second rubber-modified acrylic-based graft copolymer having an average particle diameter of greater than or equal to about 200 nm and less than or equal to about 400 nm, (C) about 5 to about 40 wt % of a first vinyl-based copolymer of an alkyl(meth)acrylate monomer, an aromatic vinyl monomer, and an unsaturated nitrile monomer wherein the alkyl(meth)acrylate monomer is included in an amount of greater than or equal to about 50 wt %, and (D) about 50 to about 85 wt % of a polycarbonate resin.

The molded article for an automobile may be a radiator grill and/or an outside mirror housing.

The radiator grill and the outside mirror housing as an exterior molded part of an auto should have excellent impact strength, heat resistance, weather resistance and coloring properties as well as excellent stability to ultraviolet (UV) ray.

Accordingly, there have been attempts to use a thermoplastic resin composition obtained by alloying an ASA resin consisting of an acrylate-styrene-acrylonitrile copolymer having excellent ultraviolet (UV) stability and a polycarbonate (PC) resin having excellent impact strength, heat resistance and the like. A conventional ASA/PC alloy composition, however, has insufficient coloring properties due to the refractive index difference between the ASA resin and the PC resin. When the thermoplastic resin composition has insufficient coloring properties, a molded article formed of the thermoplastic resin composition may be painted. This, however, can increase costs and defective product rates. Further, there can be environmental concerns associated with painting.

The present invention solves this problem and provides a radiator grill or an outside mirror housing molded article for an automobile by using a thermoplastic resin composition having excellent coloring properties and stability to ultraviolet (UV) ray and simultaneously, excellent impact strength, heat resistance and weather resistance without painting.

Hereinafter, each component of the thermoplastic resin composition is described in detail.

(A) First Rubber-Modified Acrylic-Based Graft Copolymer

The first rubber-modified acrylic-based graft copolymer (A) can have improved weather resistance and coloring properties and may realize excellent impact resistance at a low temperature or room temperature.

The first rubber-modified acrylic-based graft copolymer (A) may have an average particle diameter of greater than or equal to about 100 nm and less than about 200 nm. For example, the average particle diameter may be greater than or equal to about 110 nm and less than about 200 nm, greater than or equal to about 120 nm and less than about 200 nm, greater than or equal to about 130 nm and less than or equal to about 200 nm, greater than or equal to about 140 nm and less than about 200 nm, or greater than or equal to about 150 nm and less than about 200 nm. Within the above ranges, an impact-reinforcing effect may be maximized and simultaneously coloring properties and gloss may be improved.

The first rubber-modified acrylic-based graft copolymer (A) may be a copolymer having a core-shell structure where a polymer of an aromatic vinyl monomer and a unsaturated nitrile monomer is grafted on an acrylic-based rubbery polymer core (a1)) to form a shell layer (a2).

The acrylic-based rubbery polymer core (a1)) may be a polymer including an alkyl(meth)acrylate monomer. Herein, the term alkyl refers to C1 to C10 alkyl. Examples of the alkyl(meth)acrylate monomer may include without limitation methyl(meth)acrylate, ethyl(meth)acrylate, propyl(meth)acrylate, isopropyl(meth)acrylate, butyl(meth)acrylate, t-butyl(meth)acrylate, octyl(meth)acrylate, 2-ethylhexyl(meth)acrylate, and the like, and combinations thereof.

The acrylic-based rubbery polymer core (a1)) may be copolymerized with one or more other radical polymerizable monomers such as styrene and the like. As used herein, the other radical polymerization monomers may be used in an amount of about 5 to about 30 wt %, for example about 10 to about 20 wt %, based on the total amount (total weight, 100 wt %) of the acrylic-based rubbery polymer core.

In some embodiments, the acrylic-based rubbery polymer core (a1)) may include the other radical polymerizable monomer in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the radical polymerizable monomer can be in a range from about any of the foregoing amounts to about any other of the foregoing amounts.

Also in some embodiments, the acrylic-based rubbery polymer core (a1) may include alkyl(meth)acrylate monomer in an amount of about 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the alkyl(meth)acrylate monomer can be in a range from about any of the foregoing amounts to about any other of the foregoing amounts.

Examples of the aromatic vinyl monomer may include without limitation styrene, o-ethyl styrene, m-ethyl styrene, p-ethyl styrene, α-methyl styrene, o-t-butyl styrene, bromo styrene, chloro styrene, trichloro styrene, and the like, combinations thereof.

Examples of the unsaturated nitrile monomer may include without limitation acrylonitrile, methacrylonitrile, fumaronitrile, and the like, and combinations thereof.

The first rubber-modified acrylic-based graft copolymer (A) may include about 40 to about 70 wt % of the acrylic-based rubbery polymer core (a1)) and about 30 to about 60 wt % of the shell layer (a2), each based on the total weight (100 wt %) of the first rubber-modified acrylic-based graft copolymer (A).

In some embodiments, the first rubber-modified acrylic-based graft copolymer (A) may include the acrylic-based rubbery polymer core (a1)) in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the acrylic-based rubbery polymer core (a1)) can be in a range from about any of the foregoing amounts to about any other of the foregoing amounts.

In some embodiments, the first rubber-modified acrylic-based graft copolymer (A) may include the shell layer (a2) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the amount of the shell layer (a2) can be in a range from about any of the foregoing amounts to about any other of the foregoing amounts.

Herein, the additives may improve productivity but decrease generation of a solidified product during graft polymerization and thus, sufficiently increase a grafting ratio and improve appearance characteristic, impact resistance and coloring properties of a final molded article.

The first rubber-modified acrylic-based graft copolymer (A) may be, for example a copolymer having a core-shell structure including an acrylic-based rubbery polymer core (a1)) including an internal core layer (a1-1) including an alkyl(meth)acrylate monomer and an aromatic vinyl monomer, and an external core layer (a1-2) including an alkyl (meth)acrylate-based polymer; and a shell layer (a2) formed by grafting a copolymer of an aromatic vinyl monomer and an unsaturated nitrile monomer on the acrylic-based rubbery polymer core (a1).

The alkyl(meth)acrylate monomer, aromatic vinyl monomer and unsaturated nitrile monomer are the same as described above.

The internal core layer (a1-1) may use an aromatic vinyl monomer as a copolymerization monomer to improve a refractive index of the thermoplastic resin composition and thus, improve coloring properties of the thermoplastic resin composition including a first rubber-modified acrylic-based graft copolymer (A).

In general, when an aromatic vinyl monomer is introduced into a core, impact strength at a low temperature is deteriorated due to increase of a glass transition temperature. However, the first rubber-modified acrylic-based graft copolymer (A) may suppress the increase of the glass transition temperature, since the exterior core (a1-2) surrounds a copolymer component of the aromatic vinyl monomer of the internal core (a1-1) and thus can improve impact resistance.

The internal core layer (a1-1) may be formed through copolymerization of about 20 to about 80 wt % of the alkyl(meth)acrylate monomer with about 80 to about 20 wt % of the aromatic vinyl monomer. For example, the internal core layer (a1-1) may be formed through copolymerization of about 20 to about 50 wt % of the alkyl(meth)acrylate monomer with about 50 to about 80 wt % of the aromatic vinyl monomer.

In some embodiments, the internal core layer (a1-1) may be formed through copolymerization of the alkyl(meth)acrylate monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the alkyl(meth)acrylate monomer can be in a range from about any of the foregoing amounts to about any other of the foregoing amounts.

In some embodiments, the internal core layer (a1-1) may be formed through copolymerization of the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl monomer can be in a range from about any of the foregoing amounts to about any other of the foregoing amounts.

Herein, a molded article using the thermoplastic resin composition may secure excellent coloring properties and impact resistance.

The external core layer (a1-2) includes an alkyl(meth)acrylate-based polymer. The alkyl(meth)acrylate-based polymer may be a homopolymer or a copolymer obtained by copolymerizing more than one alkyl(meth)acrylate monomer.

The external core layer (a1-2) can be evenly polymerized on the surface of the internal core layer (a1-1) by using the alkyl(meth)acrylate monomer, a grafting agent, and a cross-linking agent and thus, can have a structure of surrounding the internal core layer. Accordingly, the external core layer (a1-2) may suppress an increase of a glass transition temperature due to the copolymer of the aromatic vinyl monomer in the internal core layer and thus can simultaneously improve impact resistance and coloring properties.

The acrylic-based rubbery polymer core (a1)) may include about 10 to about 50 wt % of the internal core layer (a1-1) and about 50 to about 90 wt % of the external core layer (a1-2).

In some embodiments, the acrylic-based rubbery polymer core (a1)) may include the internal core layer (a1-1) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the internal core layer (a1-1) can be in a range from about any of the foregoing amounts to about any other of the foregoing amounts.

In some embodiments, the acrylic-based rubbery polymer core (a1)) may include the external core layer (a1-2) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the external core layer (a1-2) can be in a range from about any of the foregoing amounts to about any other of the foregoing amounts.

The acrylic-based rubbery polymer core (a1) has an average particle diameter ranging from greater than or equal to about 100 nm to less than about 200 nm, a gel content ranging from about 80 to about 98 wt %, and a swelling index ranging from about 10 to about 25%.

The shell layer (a2) may be formed of a copolymer of an aromatic vinyl monomer and an unsaturated nitrile monomer grafted into the acrylic-based rubbery polymer core (a1) having a double structure. The thermoplastic resin composition including the same first rubber-modified acrylic-based graft copolymer (A) using the above may realize excellent impact resistance and coloring properties.

The aromatic vinyl monomer and unsaturated nitrile monomer are the same as described above.

The shell layer (a2) may include about 60 to about 80 wt % of an aromatic vinyl monomer and about 20 to about 40 wt % of an unsaturated nitrile monomer.

In some embodiments, the shell layer (a2) may include the aromatic vinyl monomer in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl monomer can be in a range from about any of the foregoing amounts to about any other of the foregoing amounts.

In some embodiments, the shell layer (a2) may include the unsaturated nitrile monomer in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the amount of the unsaturated nitrile monomer can be in a range from about any of the foregoing amounts to about any other of the foregoing amounts.

Herein, deterioration of weather resistance due to photo-oxididation mechanism may be suppressed, and thus, properties such as coloring properties, polymerization stability, fluidity and the like may be improved.

The shell layer (a2) may have a grafting ratio ranging from about 40 to about 80%. Herein, impact resistance, appearance characteristics, and fluidity may be improved. The grafting ratio may be calculated according to the following Calculation Equation 1.

Grafting ratio=(the weight of undissolved powder after drying–the amount of a rubbery polymer)/(the amount of the rubbery polymer based on a solid content)×100  [Calculation Equation 1]

A method of manufacturing the first rubber-modified acrylic-based graft copolymer (A) for example can include a first step of forming an acrylic-based rubbery polymer core (a1)) by forming an internal core layer (a1-1) through polymerization of an alkyl(meth)acrylate monomer and an aromatic vinyl monomer and then, an external core layer (a1-2) through introduction of an alkyl(meth)acrylate monomer into the internal core layer (a1-1); and a second step of forming a shell layer (a2) by injecting a mixture of an aromatic vinyl monomer and an unsaturated nitrile monomer into the acrylic-based rubbery polymer core (a1)) to perform graft polymerization.

The thermoplastic resin composition may include the first rubber-modified acrylic-based graft copolymer (A) in an amount of about 1 to about 20 wt %, for example about 5 to about 20 wt %, based on total amount (total weight, 100 wt %) of the thermoplastic resin composition. In some embodiments, the thermoplastic resin composition may include the first rubber-modified acrylic-based graft copolymer (A) in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the first rubber-modified acrylic-based graft copolymer (A) can be in a range from about any of the foregoing amounts to about any other of the foregoing amounts.

(B) Second Rubber-Modified Acrylic-Based Graft Copolymer

The second rubber-modified acrylic-based graft copolymer (B) may be a copolymer having a core-shell structure where a polymer of an aromatic vinyl monomer and unsaturated nitrile monomer is grafted on an acrylic-based rubbery polymer core (b1) to form a shell layer (b2). However, the second rubber-modified acrylic-based graft copolymer (B) is different from the first rubber-modified acrylic-based graft copolymer (A).

The second rubber-modified acrylic-based graft copolymer (B) may have an average particle diameter of greater than or equal to about 200 nm and less than or equal to about 400 nm. For example, the average particle diameter may be about 220 to about 400 nm, about 240 to about 400 nm, about 260 to about 400 nm, about 280 to about 400 nm, about 300 to about 400 nm, about 200 to about 380 nm, about 200 to about 360 nm, or about 200 to about 350 nm. Within the above ranges, impact resistance and coloring properties may be improved.

The thermoplastic resin composition includes both the first rubber-modified acrylic-based graft copolymer (A) and the second rubber-modified acrylic-based graft copolymer (B) and thereby can exhibit excellent appearance characteristic and impact resistance, simultaneously.

The acrylic-based rubbery polymer core (b1) may be a polymer including an alkyl(meth)acrylate monomer. As used herein, the term alkyl refers to C1 to C10 alkyl. Examples of the alkyl(meth)acrylate monomer may include without limitation methyl(meth)acrylate, ethyl(meth)acrylate, propyl(meth)acrylate, isopropyl(meth)acrylate, butyl(meth)acrylate, t-butyl(meth)acrylate, octyl(meth)acrylate, 2-ethylhexyl(meth)acrylate, and the like, and combinations thereof.

The acrylic-based rubbery polymer core (b1) may be copolymerized with one or more other radical polymerizable monomers such as styrene and the like. As used herein, the other radical polymerization monomers may be used in an amount of about 5 to about 30 wt %, for example about 10 to about 20 wt %, based on the total amount (total weight, 100 wt %) of the acrylic-based rubbery polymer core.

In some embodiments, the acrylic-based rubbery polymer core (b1) may include the other radical polymerizable monomer in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the radical polymerizable monomer can be in a range from about any of the foregoing amounts to about any other of the foregoing amounts.

Also in some embodiments, the acrylic-based rubbery polymer core (b1) may include alkyl(meth)acrylate monomer in an amount of about 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the alkyl(meth)acrylate monomer can be in a range from about any of the foregoing amounts to about any other of the foregoing amounts.

Examples of the aromatic vinyl monomer may include without limitation styrene, o-ethyl styrene, m-ethyl styrene, p-ethyl styrene, α-methyl styrene, o-t-butyl styrene, bromo styrene, chloro styrene, trichloro styrene, and the like, and combinations thereof.

Examples of the unsaturated nitrile monomer may include without limitation acrylonitrile, methacrylonitrile, fumaronitrile, and the like, and combinations thereof.

The second rubber-modified acrylic-based graft copolymer (B) may be for example a copolymer having a core-shell structure including an acrylic-based rubbery polymer core (b1) including an alkyl (meth)acrylate monomer and having a weight average molecular weight of about 200,000 to about 10,000,000 g/mol; and (b2) a shell layer formed by grafting a copolymer of an aromatic vinyl monomer and a unsaturated nitrile monomer on the acrylic-based rubbery polymer core and having a weight average molecular weight of about 50,000 to about 500,000 g/mol. Herein, the thermoplastic resin composition including the second rubber-modified acrylic-based graft copolymer (B) may show excellent fluidity and impact resistance.

The second rubber-modified acrylic-based graft copolymer (B) may include about 30 to about 80 wt % of the acrylic-based rubbery polymer core (b1) and about 20 to about 70 wt % of the shell layer (b2), each based on the total weight (100 wt %) of the second rubber-modified acrylic-based graft copolymer (B).

In some embodiments, the second rubber-modified acrylic-based graft copolymer (B) may include the acrylic-based rubbery polymer core (b1) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the acrylic-based rubbery polymer core (b1) can be in a range from about any of the foregoing amounts to about any other of the foregoing amounts.

In some embodiments, the second rubber-modified acrylic-based graft copolymer (B) may include the shell layer (b2) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the shell layer (b2) can be in a range from about any of the foregoing amounts to about any other of the foregoing amounts.

Within the above ranges, weather resistance, low temperature impact resistance and/or dispersibility may be improved.

According to one embodiment, the second rubber-modified acrylic-based graft copolymer (B) may include an acrylic-based rubbery polymer core (b1) including a first core layer (b1-1) including an alkyl(meth)acrylate-based polymer, a second core layer (b1-2) including a copolymer of an alkyl(meth)acrylate monomer and an aromatic vinyl monomer and formed outside of the first core layer, and a third core layer (b1-3) including a copolymer of an alkyl (meth)acrylate monomer and an aromatic vinyl monomer and formed outside of the second core layer and in addition, a shell layer (b2) formed of an aromatic vinyl monomer and an unsaturated nitrile monomer grafted into the third core layer (b1-3). Herein, a thermoplastic resin composition including the second rubber-modified acrylic-based graft copolymer (B) may realize excellent impact resistance.

The second core layer (b1-2) and the third core layer (b1-3) may improve coloring properties of the thermoplastic resin composition including the second rubber-modified acrylic-based graft copolymer (B) by using an aromatic vinyl monomer as a copolymerization monomer.

The alkyl(meth)acrylate-based polymer, the alkyl(meth)acrylate monomer, the aromatic vinyl monomer and the unsaturated nitrile monomer are the same as described above.

The acrylic-based rubbery polymer core (b1) may include about 26 to about 30 wt % of the first core layer (b1-1), about 35 to about 37 wt % of the second core layer (b1-2), and about 35 to about 37 wt % of the third core layer (b1-3). Within the above ranges, excellent impact resistance may be realized.

In some embodiments, the acrylic-based rubbery polymer core (b1) may include the first core layer (b1-1) in an amount of about 26, 27, 28, 29, or 30 wt %. Further, according to some embodiments of the present invention, the amount of the first core layer (b1-1) can be in a range from about any of the foregoing amounts to about any other of the foregoing amounts.

In some embodiments, the acrylic-based rubbery polymer core (b1) may include the second core layer (b1-2) in an amount of about 35, 36, or 37 wt %. Further, according to some embodiments of the present invention, the amount of the second core layer (b1-2) can be in a range from about any of the foregoing amounts to about any other of the foregoing amounts.

In some embodiments, the acrylic-based rubbery polymer core (b1) may include the third core layer (b1-3) in an amount of about 35, 36, or 37 wt %. Further, according to some embodiments of the present invention, the amount of the third core layer (b1-3) can be in a range from about any of the foregoing amounts to about any other of the foregoing amounts.

One example of the second core layer (b1-2) may include about 80 to about 99 wt % of an alkyl (meth)acrylate monomer and about 1 to about 20 wt % of an aromatic vinyl monomer.

In some embodiments, the second core layer (b1-2) may include the alkyl (meth)acrylate monomer in an amount of about 80, 81, 82, 83, 84, 85, 86, 87, 88, 89, 90, 91, 92, 93, 94, 95, 96, 97, 98, or 99 wt %. Further, according to some embodiments of the present invention, the amount of the alkyl (meth)acrylate monomer can be in a range from about any of the foregoing amounts to about any other of the foregoing amounts.

In some embodiments, the second core layer (b1-2) may include the aromatic vinyl monomer in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the aromatic vinyl monomer can be in a range from about any of the foregoing amounts to about any other of the foregoing amounts.

Within the above range, impact resistance and coloring properties may be improved.

The third core layer (b1-3) may include about 80 to about 99 wt % of an alkyl(meth)acrylate monomer and about 1 to about 20 wt % of an aromatic vinyl monomer. In some embodiments, the third core layer (b1-3) may include the alkyl (meth)acrylate monomer in an amount of about 80, 81, 82, 83, 84, 85, 86, 87, 88, 89, 90, 91, 92, 93, 94, 95, 96, 97, 98, or 99 wt %. Further, according to some embodiments of the present invention, the amount of the alkyl (meth)acrylate monomer can be in a range from about any of the foregoing amounts to about any other of the foregoing amounts.

In some embodiments, the third core layer (b1-3) may include the aromatic vinyl monomer in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the aromatic vinyl monomer can be in a range from about any of the foregoing amounts to about any other of the foregoing amounts.

When the third core layer (b1-3) includes alkyl(meth)acrylate monomer and aromatic vinyl monomer in amounts within the above ranges, a binding force between the core layer and the shell layer may be increased, and thus, impact resistance and coloring properties may be improved.

The second core layer (b1-2) and the third core layer (b1-3) may further include a cross-linking agent. Specifically, the cross-linking agent may be included in an amount of about 0.5 to about 1.5 parts by weight based on about 100 parts by weight of the alkyl (meth)acrylate monomer included in the acrylic-based rubbery polymer core (b1). The cross-linking agent may increase a bond between the second and third core layers.

The acrylic-based rubbery polymer core (b1) may include a rubbery polymer having an average particle diameter of greater than or equal to about 200 nm and less than or equal to about 400 nm and a gel content of about 80 to about 98 wt %.

The acrylic-based rubbery polymer core (b1) may have gradually increasing cross-linking density in an order of the first core layer (b1-1), the second core layer (b1-2), and the third core layer (b1-3). In this case, the second rubber-modified acrylic-based graft copolymer (B) may realize excellent impact resistance.

The shell layer (b2) may include about 60 to about 90 wt % of an aromatic vinyl monomer and about 10 to about 40 wt % of an unsaturated nitrile monomer.

In some embodiments, the shell layer (b2) may include the aromatic vinyl monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl monomer can be in a range from about any of the foregoing amounts to about any other of the foregoing amounts.

In some embodiments, the shell layer (b2) may include the unsaturated nitrile monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the unsaturated nitrile monomer can be in a range from about any of the foregoing amounts to about any other of the foregoing amounts.

In this case, compatibility of the first vinyl-based copolymer (C) and the second vinyl-based copolymer (E) may be improved.

The grafting ratio of the shell layer (b2) may be about 40 to about 90%. Herein, impact resistance, appearance characteristics, and/or fluidity may be improved.

The thermoplastic resin composition may include the second rubber-modified acrylic-based graft copolymer (B) in an amount of about 1 to about 20 wt %, for example about 5 to about 20 wt %, based on the total amount (total weight, 100 wt %) of the thermoplastic resin composition. In some embodiments, the thermoplastic resin composition may include the second rubber-modified acrylic-based graft copolymer (B) in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the second rubber-modified acrylic-based graft copolymer (B) can be in a range from about any of the foregoing amounts to about any other of the foregoing amounts.

The thermoplastic resin composition may include the first rubber-modified acrylic-based graft copolymer (A) and second rubber-modified acrylic-based graft copolymer (B) in a total amount of about 2 to about 40 wt % based on the total amount (total weight, 100 wt %) of the thermoplastic resin composition. In some embodiments, the thermoplastic resin composition may include the first rubber-modified acrylic-based graft copolymer (A) and second rubber-modified acrylic-based graft copolymer (B) in a combined total amount of about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the total combined amount of the first rubber-modified acrylic-based graft copolymer (A) and second rubber-modified acrylic-based graft copolymer (B) can be in a range from about any of the foregoing amounts to about any other of the foregoing amounts.

Herein, a molded article using the thermoplastic resin composition may show excellent weather resistance, impact resistance and/or coloring properties.

(C) First Vinyl-Based Copolymer

The first vinyl-based copolymer may be obtained by copolymerizing an alkyl(meth)acrylate monomer, an aromatic vinyl monomer and an unsaturated nitrile monomer. The thermoplastic resin composition includes the first vinyl-based copolymer and thus, may improve coloring properties.

The alkyl of the alkyl(meth)acrylate monomer refers to C1 to C10 alkyl. Examples of the alkyl(meth)acrylate monomer may include without limitation methyl(meth)acrylate, ethyl(meth)acrylate, propyl(meth)acrylate, isopropyl(meth)acrylate, butyl(meth)acrylate, t-butyl(meth)acrylate, octyl(meth)acrylate, 2-ethylhexyl(meth)acrylate, and the like, and combinations thereof.

Examples of the aromatic vinyl monomer may include without limitation styrene, o-ethyl styrene, m-ethyl styrene, p-ethyl styrene, α-methyl styrene, o-t-butyl styrene, bromo styrene, chloro styrene, trichloro styrene, and the like, and combinations thereof.

Examples of the unsaturated nitrile monomer may include without limitation acrylonitrile, methacrylonitrile, fumaronitrile, and the like, and combinations thereof.

The first vinyl-based copolymer (C) may include the alkyl(meth)acrylate monomer in an amount of greater than or equal to about 50 wt % based on the total weight of the first vinyl-based copolymer (C). For example, the alkyl (meth)acrylate monomer may be included in an amount of about 50 to about 95 wt %, about 50 to about 90 wt %, and about 50 to about 89 wt %. In some embodiments, the first vinyl-based copolymer (C) may include the alkyl(meth)acrylate monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the alkyl(meth)acrylate monomer can be in a range from about any of the foregoing amounts to about any other of the foregoing amounts.

Herein, the first vinyl-based copolymer (C) may realize excellent coloring properties.

The first vinyl-based copolymer (C) may have a weight average molecular weight ranging from about 90,000 to about 200,000 g/mol.

The first vinyl-based copolymer (C) has a similar refractive index to an average refractive index of the first rubber-modified acrylic-based graft copolymer (A) and the second rubber-modified acrylic-based graft copolymer (B), and a molded article using a thermoplastic resin composition including these may realize excellent coloring properties.

Specifically, the average refractive index of the first rubber-modified acrylic-based graft copolymer (A) and the second rubber-modified acrylic-based graft copolymer (B) may have a difference ranging from about 0.001 to about 0.02 from a refractive index of the first vinyl-based copolymer (C). Herein, the molded article may show excellent coloring properties.

The thermoplastic resin composition may include the first vinyl-based copolymer (C) in an amount of about 5 to about 40 wt %, for example about 10 to about 40 wt %, based on total amount (total weight, 100 wt %) of the thermoplastic resin composition. In some embodiments, the thermoplastic resin composition may include the first vinyl-based copolymer (C) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the first vinyl-based copolymer (C) can be in a range from about any of the foregoing amounts to about any other of the foregoing amounts.

(D) Polycarbonate Resin

In the thermoplastic resin composition, the polycarbonate resin (D) can be a polyester having a carbonate group but has no particular limit in its kind and may include any polycarbonate resin usable in a thermoplastic resin composition field.

For example, the polycarbonate resin may be prepared by reacting one or more diphenols represented by the following Chemical Formula 1 with a compound of a phosgene, halogen formate, carbonate ester, or a combination thereof.

Examples of the diphenols may include without limitation hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof.

The polycarbonate resin may have a weight average molecular weight ranging from about 5,000 to about 200,000 g/mol, for example about 5,000 to about 40,000 g/mol, for mechanical and molding properties.

The polycarbonate resin may be a copolymer or a mixture of copolymers obtained using two or more dipenols that differ from each other. The polycarbonate resin also may include one or more of a linear polycarbonate resin, a branched polycarbonate resin, a polyestercarbonate copolymer resin, and the like.

The linear polycarbonate resin may include a bisphenol-A-based polycarbonate resin. The branched polycarbonate resin may be produced by reacting a multi-functional aromatic compound such as trimellitic anhydride, trimellitic acid, and the like with one or more diphenols and a carbonate. The multi-functional aromatic compound may be included in an amount of about 0.05 to about 2 mol % based on the total weight of the branched polycarbonate resin. The polyester carbonate copolymer resin may be produced by reacting difunctional carboxylic acid with one or more diphenols and a carbonate. The carbonate may include a diaryl carbonate such as diphenyl carbonate, ethylene carbonate, and the like, and combinations thereof.

The thermoplastic resin composition may include the polycarbonate resin in an amount of about 50 to about 85 wt %, for example about 50 to about 80 wt %, based on the total weight of the thermoplastic resin composition. In some embodiments, the thermoplastic resin composition may include the polycarbonate resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments of the present invention, the amount of the polycarbonate resin can be in a range from about any of the foregoing amounts to about any other of the foregoing amounts.

(E) Second Vinyl-Based Copolymer

The thermoplastic resin composition may further include a second vinyl-based copolymer (E) obtained by copolymerizing an aromatic vinyl monomer and an unsaturated nitrile monomer. Herein, a molded article using the thermoplastic resin composition may have improved weather resistance and/or impact resistance.

Examples of the aromatic vinyl monomer may include without limitation styrene, o-ethyl styrene, m-ethyl styrene, p-ethyl styrene, α-methyl styrene, o-t-butyl styrene, bromo styrene, chloro styrene, trichloro styrene, and the like, and combinations thereof.

Examples of the unsaturated nitrile monomer may include without limitation acrylonitrile, methacrylonitrile, fumaronitrile, and the like, and combinations thereof.

The second vinyl-based copolymer (E) may include about 60 to about 80 wt % of the aromatic vinyl monomer and about 20 to about 40 wt % of the unsaturated nitrile monomer.

In some embodiments, the second vinyl-based copolymer (E) may include the aromatic vinyl monomer in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl monomer can be in a range from about any of the foregoing amounts to about any other of the foregoing amounts.

In some embodiments, the second vinyl-based copolymer (E) may include the unsaturated nitrile monomer in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the amount of the unsaturated nitrile monomer can be in a range from about any of the foregoing amounts to about any other of the foregoing amounts.

When the aromatic vinyl monomer and the unsaturated nitrile monomer are included in amounts within the above ranges, thermal discoloring may be suppressed, and chemical resistance may be improved.

The second vinyl-based copolymer (E) may have a weight average molecular weight ranging from about 80,000 to about 200,000 g/mol, for example about 85,000 to about 120,000 g/mol. When the weight average molecular weight is within the above range, excellent fluidity may be secured, which can improve productivity.

The thermoplastic resin composition may include the second vinyl-based copolymer (E) in an amount of about 0 to about 20 wt %, for example about 1 to about 20 wt %, and as another example about 1 to about 15 wt %, and as another example about 1 to about 10 wt %, based on the total amount (total weight, 100 wt %) of the thermoplastic resin composition. In some embodiments, the thermoplastic resin composition may include the second vinyl-based copolymer (E) in an amount of 0 (the second vinyl-based copolymer (E) is not present), about 0 (the second vinyl-based copolymer (E) is present), 1, 2, 3, 4, 5, 6, 7, 8, 9, 10, 11, 12, 13, 14, 15, 16, 17, 18, 19 or 20 wt %. Further, according to some embodiments of the present invention, the amount of the second vinyl-based copolymer (E) can be in a range from about any of the foregoing amounts to about any other of the foregoing amounts.

When the second vinyl-based copolymer (E) is used in an amount within the above range, a molded article using the thermoplastic resin composition may show excellent weather resistance, impact resistance and/or coloring properties.

(F) Other Additives

In addition to the components (A) to (E), the thermoplastic resin composition may further include at least one or more other additives as necessary to improve injection-molding properties, balance each property and/or depending on final use of the thermoplastic resin composition. Examples of the other additives may include without limitation flame retardants, surfactants, nucleating agents, coupling agents, fillers, plasticizers, impact-reinforcing agents, lubricants, antibacterial agents, release agents, heat stabilizers, antioxidants, light stabilizers, inorganic material additives, colorants, stabilizers, lubricants, anti-static agents, pigments, dyes, flame-proofing agents, and the like, and may be used singularly or in a combination of two or more.

These additives may be appropriately used within a range doing no damage on properties of the thermoplastic resin composition, for example in an amount of less than or equal to about 20 parts by weight based on about 100 parts by weight of the entire thermoplastic resin composition of the (A) to (E) components but is not limited thereto.

The molded article for an automobile may show excellent impact strength, heat resistance, weather resistance and/or coloring properties.

The molded article may have Izod impact strength ranging from about 50 to about 90 kgf·cm/cm, for example, about 50 to about 70 kgf·cm/cm at room temperature (23° C.). This result shows that the molded article can have excellent impact resistance. The Izod impact strength is measured by making a notch in a ⅛" Izod specimen in an evaluation method according to ASTM D256.

The molded article may be black, and an L value of the molded article in a color coordinate of International Commission on Illumination (CIE) may be about 27 to about 29. This result shows that the molded article can have high coloring properties and can be highly black.

The L value indicates brightness in the CIE color coordinate. As the L value is higher, brightness is higher, and color sense is brighter, which indicates black has low coloring properties. The L value is measured based on SCI (specular component included) by using a spectrophotometer equipment.

The molded article for an automobile may have a Vicat softening temperature (VST) ranging from about 100° C. to about 140° C., for example about 110° C. to about 130° C. This result shows that the molded article can have excellent heat resistance. The softening temperature may be measured under an ISO 306/B50 condition.

The molded article for an automobile may have ΔE ranging from about 0.1 to about 4.0, for example about 1.0 to about 3.5, as another example about 1.0 to about 3.0, and as another example about 2.0 to about 3.0 after a 2,500 kJ exposure evaluation under a SAE J1960 condition. This result shows that the molded article can have excellent weather resistance.

The ΔE is an index showing a color difference in a color coordinate of International Commission on Illumination (CIE). The ΔE may be calculated according to the following Calculation 2.

$$\Delta E = \sqrt{(\Delta L)^2 + (\Delta a)^2 + (\Delta b)^2}$$ [Calculation Equation 2]

In the CIE Lab color coordinate, brightness is marked as L, and chromaticity indicating a color and a chroma is marked as a and b. As the a is larger, the color is closer to red, and as the a is smaller, the color is closer to green. As the b is larger, the color is closer to yellow, and as the b is smaller, the color is closer to blue.

As the ΔE is smaller after a 2,500 kJ exposure evaluation under a SAE J1960 condition, excellent weather resistance can be obtained.

Hereinafter, the present invention is illustrated in more detail with reference to the following examples and comparative examples. However, the following examples and comparative examples are provided for the purpose of descriptions and the present invention is not limited thereto.

EXAMPLES AND COMPARATIVE EXAMPLES

A pellet-shaped thermoplastic resin composition is prepared by mixing the components according to the following Table 1 and then extruding and processing the mixture. The extrusion is performed by using a twin-screw extruder having L/D=29 and a diameter of 45 mm and setting a barrel temperature at 260° C.

acrylonitrile into 60 parts by weight of a three-layered rubbery polymer core including a butyl acrylate rubbery polymer in the first layer, a butyl acrylate-styrene copolymer in the second layer, and a butyl acrylate-styrene copolymer including more styrene than the copolymer of the second layer in the third layer. The graft ASA resin has an average particle diameter of 320 nm, a grafting ratio of 85%, and a refractive index of 1.511.

(C) Methylmethacrylate-Styrene-Acrylonitrile Copolymer

A MSAN resin made by Cheil Industries Inc. is a copolymer including 5 wt % of acrylonitrile, 20 wt % of styrene, and 75 wt % of methylmethacrylate and has a weight average molecular weight of about 120,000 g/mol and a refractive index of 1.511.

(D) Polycarbonate Resin

A polycarbonate resin SC-1190 made by Cheil Industries Inc. has a weight average molecular weight of about 22,000 g/mol.

(E) Styrene-Acrylonitrile Copolymer

A SAN resin, HF-5671 made by Cheil Industries Inc. is a copolymer including 24 wt % of acrylonitrile and 76 wt % of styrene and has a weight average molecular weight of about 110,000 g/mol.

(E') Styrene-Acrylonitrile Copolymer

A SAN resin HN-5540 made by Cheil Industries Inc. is a copolymer including 40 wt % of acrylonitrile and 60 wt % of styrene and has a weight average molecular weight of about 120,000 g/mol.

TABLE 1

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| First rubber-modified acrylic-based graft copolymer (A) | 15 | 10 | 7 | 7 | 7 | 20 | — | 20 | 20 | 40 | — |
| Second rubber-modified acrylic-based graft copolymer (B) | 5 | 10 | 13 | 13 | 13 | — | 20 | — | — | — | — |
| Methylmethacrylate-styrene-acrylonitrile copolymer (C) | 20 | 20 | 20 | 30 | 10 | 20 | 20 | — | — | 20 | 40 |
| Polycarbonate (D) | 60 | 60 | 60 | 50 | 60 | 60 | 60 | 60 | 60 | 40 | 60 |
| Styrene-acrylonitrile copolymer (E) | — | — | — | — | 10 | — | — | 20 | — | — | — |
| Styrene-acrylonitrile copolymer (E') | — | — | — | — | — | — | — | — | 20 | — | — |

In the above Table 1, the contents of the (A) to (E) are units of wt %.

Each component in Table 1 is illustrated as follows.

(A) First Rubber-Modified Acrylic-Based Graft Copolymer

A double core-shell graft ASA resin is obtained by graft emulsion-polymerizing 50 parts by weight of a monomer mixture including 33 wt % of acrylonitrile and 67 wt % of styrene into 50 parts by weight of a double core including an inner core formed of a copolymer of butyl acrylate and styrene and an outer core formed of a butyl acrylate rubbery polymer. The graft ASA resin is prepared in a method disclosed in Korean Patent No. 0815995 and has an average particle diameter of 170 nm, a grafting ratio of 70%, and a refractive index of 1.528.

(B) Second Rubber-Modified Acrylic-Based Graft Copolymer

A triple core-shell graft ASA resin is obtained by graft emulsion-polymerizing 40 parts by weight of a monomer mixture including 67 wt % of styrene and 33 wt % of Evaluation Examples After drying the manufactured pellets at 80° C. for 2 hours, specimens having a size of 9 cm×5 cm×0.2 cm are manufactured to measure properties by using a 6 oz. injection molding machine and setting its cylinder temperature at 250° C. and its molding temperature at 60° C. The specimens are used to measure properties in accordance with the following methods, and the results are provided in the following Table 2.

Evaluation Example 1

Impact Resistance (Measurement of Izod Impact Strength)

Impact resistance is evaluated by making a notch in the ⅛" Izod specimen in a method according to ASTM D256. (unit: kgf·cm/cm)

Evaluation Example 2

Coloring Properties (Measurement of L Value)

A L value is measured based on SCI by using a CM-3500d spectrophotometer equipment made by Konical Minolta Inc. (unit: None)

Evaluation Example 3

Heat Resistance (Measurement of VST)

A Vicat softening temperature (VST) is measured in an evaluation method according to ISO 306/B50. (unit: ° C.)

Evaluation Example 4

Weather Resistance (Measurement of ΔE)

ΔE is measured after a 2,500 kJ exposure evaluation under a SAE J1960 condition. (unit: None)

TABLE 2

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Izod (⅛") | 55 | 58 | 60 | 55 | 55 | 41 | 65 | 40 | 45 | 70 | 5 |
| L value | 28.1 | 28.3 | 28.5 | 27.8 | 28.6 | 27.6 | 30.5 | 28.9 | 29.6 | 31.2 | 30.0 |
| VST | 120 | 120 | 120 | 112 | 119 | 119 | 117 | 119 | 119 | 95 | 131 |
| ΔE | 2.8 | 2.6 | 2.5 | 2.2 | 2.8 | 3.2 | 2.3 | 3.6 | 3.5 | 2.2 | 6.6 |

As shown in Table 2, Comparative Example 1 using no second rubber-modified acrylic-based graft copolymer (B) has insufficient impact strength and weather resistance, and Comparative Example 2 using no first rubber-modified acrylic-based graft copolymer (A) has insufficient coloring properties.

Comparative Examples 3 and 4 including neither second rubber-modified acrylic-based graft copolymer (B) nor first vinyl-based copolymer (C) has insufficient impact strength and weather resistance.

Comparative Example 5 using no second rubber-modified acrylic-based graft copolymer (B) but the first rubber-modified acrylic-based graft copolymer (A) in an amount outside of the range of the present invention has excellent impact strength but remarkably insufficient coloring properties and heat resistance.

Comparative Example 6 using no first and second rubber-modified acrylic-based graft copolymers but only the first vinyl-based copolymer (C) and the polycarbonate resin (D) has remarkably insufficient impact strength and weather resistance.

On the other hand, Examples 1 to 5 all exhibit excellent impact strength, coloring properties, heat resistance and weather resistance compared with the Comparative Examples.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A molded article for an automobile formed of a thermoplastic resin composition comprising:
   (A) about 1 to about 20 wt % of a first rubber-modified acrylic-based graft copolymer have an average particle diameter of greater than or equal to about 100 nm and less than about 200 nm,
   (B) about 1 to about 20 wt % of a second rubber-modified acrylic-based graft copolymer have an average particle diameter of greater than or equal to about 200 nm and less than or equal to about 400 nm,
   (C) about 5 to about 40 wt % of a first vinyl-based copolymer wherein an alkyl(meth)acrylate monomer, an aromatic vinyl monomer, and an unsaturated nitrile monomer are copolymerized, and including the alkyl (meth)acrylate monomer in an amount of greater than about 50 wt % based on the total weight of the alkyl(meth)acrylate monomer, an aromatic vinyl monomer, and an unsaturated nitrile monomer copolymerized to make the first vinyl-based copolymer, and
   (D) about 50 to about 85 wt % of a polycarbonate resin.

2. The molded article for an automobile of claim 1, wherein the first rubber-modified acryl-based graft copolymer (A) comprises:
   (a1) about 40 to about 70 wt % of an acrylic-based rubbery polymer core, and
   (a2) about 30 to about 60 wt % of a shell layer formed by grafting a copolymer of an aromatic vinyl monomer and unsaturated nitrile monomer on the acrylic-based rubbery polymer core.

3. The molded article for an automobile of claim 1, wherein the first rubber-modified acryl-based graft copolymer (A) comprises:
   (a1) an acrylic-based rubbery polymer core comprising (a1-1) an internal core layer including a copolymer of an alkyl(meth)acrylate monomer and an aromatic vinyl monomer and (a1-2) an external core layer including an alkyl(meth)acrylate-based polymer; and
   (a2) a shell layer formed by grafting a copolymer of an aromatic vinyl monomer and an unsaturated nitrile monomer into the acrylic-based rubbery polymer core.

4. The molded article for an automobile of claim 1, wherein the first rubber-modified acrylic-based graft copolymer (A) has a grafting ratio ranging from about 40% to about 80%.

5. The molded article for an automobile of claim 1, wherein the second rubber-modified acryl-based graft copolymer (B) comprises:
   (b1) an acrylic-based rubbery polymer core having a weight average molecular weight of about 200,000 to about 10,000,000 g/mol; and
   (b2) a shell layer formed by grafting a copolymer of an aromatic vinyl monomer and a unsaturated nitrile monomer into the acrylic-based rubbery polymer core and having a weight average molecular weight of about 50,000 to about 500,000 g/mol.

6. The molded article for an automobile of claim 1, wherein the second rubber-modified acrylic-based graft copolymer (B) comprises:
- (b1) about 30 to about 80 wt % of an acrylic-based rubbery polymer core, and
- (b2) about 20 to about 70 wt % of a shell layer formed by grafting a copolymer of an aromatic vinyl monomer and unsaturated nitrile monomer into the acrylic-based rubbery polymer core.

7. The molded article for an automobile of claim 1, wherein the second rubber-modified acrylic-based graft copolymer (B) comprises:
- (b1) an acrylic-based rubbery core comprising:
- (b1-1) a first core layer including an alkyl (meth)acrylate-based polymer,
- (b1-2) a second core layer including a copolymer of a alkyl(meth)acrylate monomer and an aromatic vinyl monomer and formed outside of the first core layer, and
- (b1-3) a third core layer including a copolymer of an alkyl(meth)acrylate monomer and an aromatic vinyl monomer and formed outside of the second core layer, and
- (b2) a shell layer formed by grafting an aromatic vinyl monomer and an unsaturated nitrile monomer into the third core layer.

8. The molded article for an automobile of claim 1, wherein the first vinyl-based copolymer (C) has a weight average molecular weight ranging from about 90,000 to about 200,000 g/mol.

9. The molded article for an automobile of claim 1, wherein an average refractive index of the first rubber-modified acrylic-based graft copolymer (A) and the second rubber-modified acrylic-based graft copolymer (B) and a refractive index of the first vinyl-based copolymer (C) has a difference ranging from about 0.001 to about 0.02.

10. The molded article for an automobile of claim 1, in which the thermoplastic resin composition further comprises a second vinyl-based copolymer (E) obtained by copolymerizing an aromatic vinyl monomer and a unsaturated nitrile monomer.

11. The molded article for an automobile of claim 10, wherein the second vinyl-based copolymer (E) comprises:
the aromatic vinyl monomer in an amount of about 60 to about 80 wt % and
the unsaturated nitrile monomer in an amount of about 20 to about 40 wt %.

12. The molded article for an automobile of claim 10, wherein the second vinyl-based copolymer (E) has a weight average molecular weight ranging from about 80,000 to about 200,000 g/mol.

13. The molded article for an automobile of claim 1, which has an Izod impact strength ranging from about 50 to about 90 kgf·cm/cm,
a Vicat softening temperature ranging from about 100 to about 140° C., and
ΔE ranging from about 0.1 to about 4.0 after a 2,500 kJ exposure evaluation under a SAE J1960 condition.

14. The molded article for an automobile of claim 1, which is black and
has an L value in a Lab color coordinate of International Commission on Illumination (CIE) in range of about 27 to about 30.

15. The molded article for an automobile of claim 1, wherein the molded article is a radiator grill.

16. The molded article for an automobile of claim 1, wherein the molded article is an outside mirror housing.

* * * * *